(Model.)

R. P. H. KOSKA.
Egg-Tongs.

No. 227,633. Patented May 18, 1880.

Witnesses:
F. E. Zerbe
J. Strobhart

Inventor:
Reinhold P. H. Koska
by J. S. Zerbe
Atty

UNITED STATES PATENT OFFICE.

REINHOLD P. H. KOSKA, OF EAST SAGINAW, MICHIGAN.

EGG-TONGS.

SPECIFICATION forming part of Letters Patent No. 227,633, dated May 18, 1880.

Application filed April 5, 1880. (Model.)

*To all whom it may concern:*

Be it known that I, REINHOLD P. H. KOSKA, of East Saginaw, in the county of Saginaw and State of Michigan, have invented a new and useful Improvement in Egg-Tongs, which improvement is fully set forth in the following specification and accompanying drawings, in which—

Figure 1:
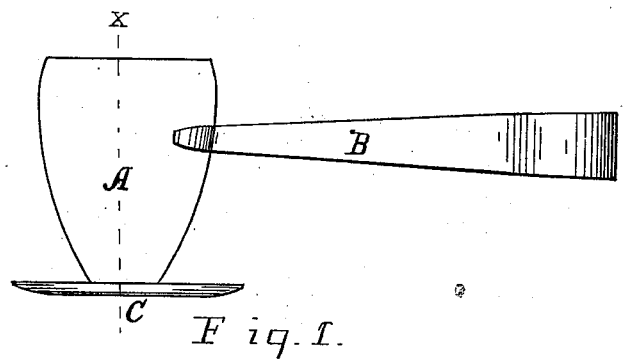
Figure 2:
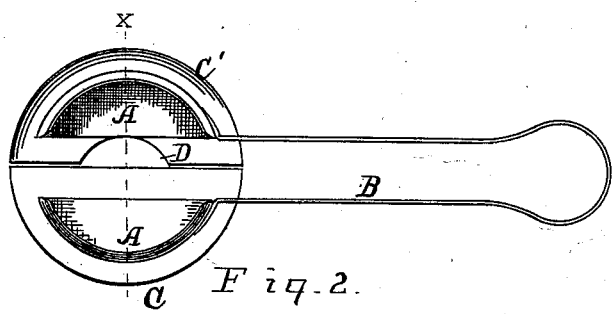
Figure 3:
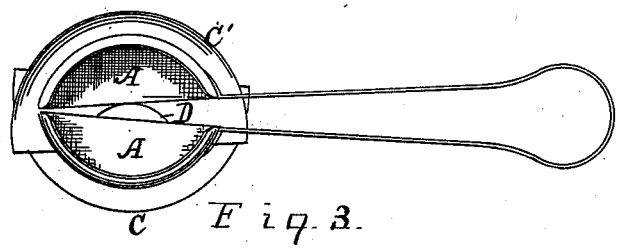
Figure 4:
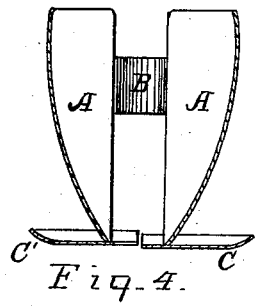

Figure 1 is a side elevation. Fig. 2 is a top view of the holder open. Fig. 3 is a top view of the same closed. Fig. 4 is a vertical transverse sectional view through the line $x$.

The object of this invention is to improve the egg-tongs for which Letters Patent No. 220,390 were formerly issued to me; and the invention consists in forming a base or support for the holder, and in so constructing the spring-handle that the shells attached thereto will remain partially closed when the pressure is released from the handle.

In the patent above referred to the handle attached to the shells kept them apart, so that it would be impossible to release the hold from the handle without dropping the egg from the holder.

I have found it to be more convenient to prepare a base for the shells, and at the same time, in manufacturing, to so form the spring that the shells will remain near enough together to hold the egg upright. To carry out this purpose, I prepare two truncated semi-cylindrical shells, A, each one of which is rigidly attached to the opposite ends of a bent spring-handle, B, as described in my previous patent.

To each of the lower ends of these shells I have soldered a base-piece composed of semicircular disks which extend slightly beyond the inner face or meeting-edges of the shells A. One of these disks, C, is placed somewhat lower than the other, C′, so that when the spring B is pressed together the disks will pass each other. The upper disk has a part of its edge D cut away centrally, to allow the shells A to fully meet each other.

Having described my invention, what I claim as new, and desire to secure by Letters Patent, is—

In an egg-tongs, the combination of the truncated semi-cylindrical shells A, secured to the spring-handle B, with base-pieces formed of semicircular disks C C′, substantially as herein specified.

In testimony that I claim the foregoing I have hereunto set my hand.

REINHOLD PAUL HENRY KOSKA.

Witnesses:
 CONRAD FEY,
 JUDSON KRIBBS.